United States Patent [19]
Saunders

[11] 4,129,120
[45] Dec. 12, 1978

[54] HEATING AND VENTILATION SYSTEM

[76] Inventor: Norman B. Saunders, 15 Ellis Rd., Weston, Mass. 02193

[21] Appl. No.: 822,346

[22] Filed: Aug. 5, 1977

Related U.S. Application Data

[60] Continuation-in-part of Ser. No. 607,568, Aug. 25, 1975, abandoned, which is a division of Ser. No. 529,235, Dec. 3, 1974, Pat. No. 3,952,947.

[51] Int. Cl.² .............................................. F24J 3/02
[52] U.S. Cl. ................................................ 126/271
[58] Field of Search ............... 237/1 A; 126/270, 271

[56] References Cited
U.S. PATENT DOCUMENTS 3,981,294  9/1976  Deminet et al. ...................... 126/271

Primary Examiner—William E. Wayner
Attorney, Agent, or Firm—Schiller & Pandiscio

[57] ABSTRACT

A heating system comprises a container having at least one heat absorbent surface, and at least one heat transmissive surface disposed so as to transmit solar heat to the internal surface. The container includes inlet means for introducing heat absorbing fluid into the container on one side of the heat absorbent surface and means disposed on the opposite side of the heat absorbent surface for withdrawing the heat absorbing fluid from the tank. The container is designed so that the fluid flow rate of the heat absorbing fluid toward the absorbent surface can be regulated so that the flow rate of heat from the heat absorbent surface remains substantially constant so as to establish a predetermined temperature gradient in the flowing fluid passing through the container.

13 Claims, 4 Drawing Figures

HEATING AND VENTILATION SYSTEM

RELATED APPLICATIONS

This application is a continuation-in-part of my copending application Ser. No. 607,568 filed Aug. 25, 1975, now abandoned, which in turn is a divisional application of application Ser. No. 529,235 filed Dec. 3, 1974, now U.S. Pat. No. 3,952,947 issued Apr. 27, 1976.

This application relates to solar energy and more particularly to fluid heating systems which derive their energy from the sun.

A great deal of interest in solar energy has recently arisen as a result of increasing financial as well as environmental costs of energy from conventional resources such as fossil fuels. Consequently, various solar energy systems have been developed to harness "insolation", i.e. the radiation received from the sun. Traditionally, these systems are considered to utilize radiation within a wavelength range of about 0.3 to 3.0 microns which includes most of the solar radiation received.

One type of system which is receiving a great deal of attention is the type which uses solar energy to heat, in general, a fluid, which in turn is used to accomplish some function. Typically, the fluid is water which is turned into hot water or steam, depending upon the particular task to be accomplished. For example, where hot water is produced, the hot water can be directly used by occupants of the building. Both hot water and steam however can also be used in various types of heating systems.

Generally, these devices take the form of a solar collector system which includes a concentrator for concentrating the solar energy to the fluid, the latter typically transmitted through a pipe.

It is an object of the present invention to provide such a system for heating a fluid with solar energy. It is another object of the present invention to provide an efficient solar heating system for heating a heat absorbent fluid.

It is another object of the present invention to provide an improved solar collector system.

These and other objects are achieved by a heating system comprising a container having at least one internal heat absorbent surface, and at least one heat transmissive surface disposed so as to transmit solar heat to the internal surface. The container includes means for introducing heat absorbing fluid into the container on one side of the heat absorbent surface, and means disposed on the opposite side of the heat absorbent surface for withdrawing the heat absorbing fluid from the container. The container is designed so that the fluid flow rate of the heat absorbing fluid toward the absorbent surface can be regulated so that the flow rate of heat from the heat absorbent surface remains substantially constant so as to establish a predetermined temperature gradient. Solar concentrators may be used to concentrate solar heat on the heat absorbent surfaces.

Other objects of the invention will in part be obvious and will in part appear hereinafter. The invention accordingly comprises the apparatus possessing the construction, combination, of elements, and arrangments of parts which are exemplified in the following detailed disclosure and the scope of the application of which will be indicated in the claims.

For a fuller understanding of the nature and objects of the present invention, reference should be had to the following detailed description taken in connection with the accompanying drawings wherein.

In the drawings, the same numerals are used to refer to like parts.

Figure 1:
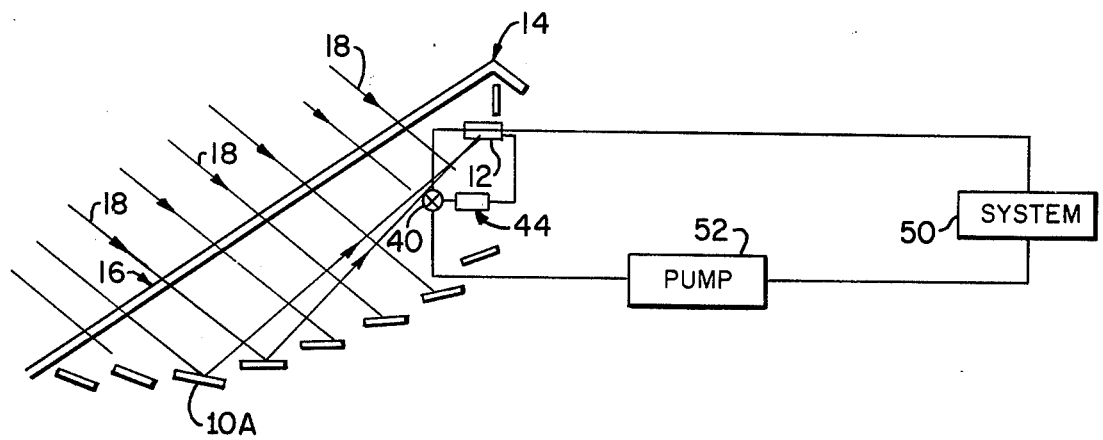
FIG. 1 is a schematic view of one embodiment of the present invention.
Figure 2:
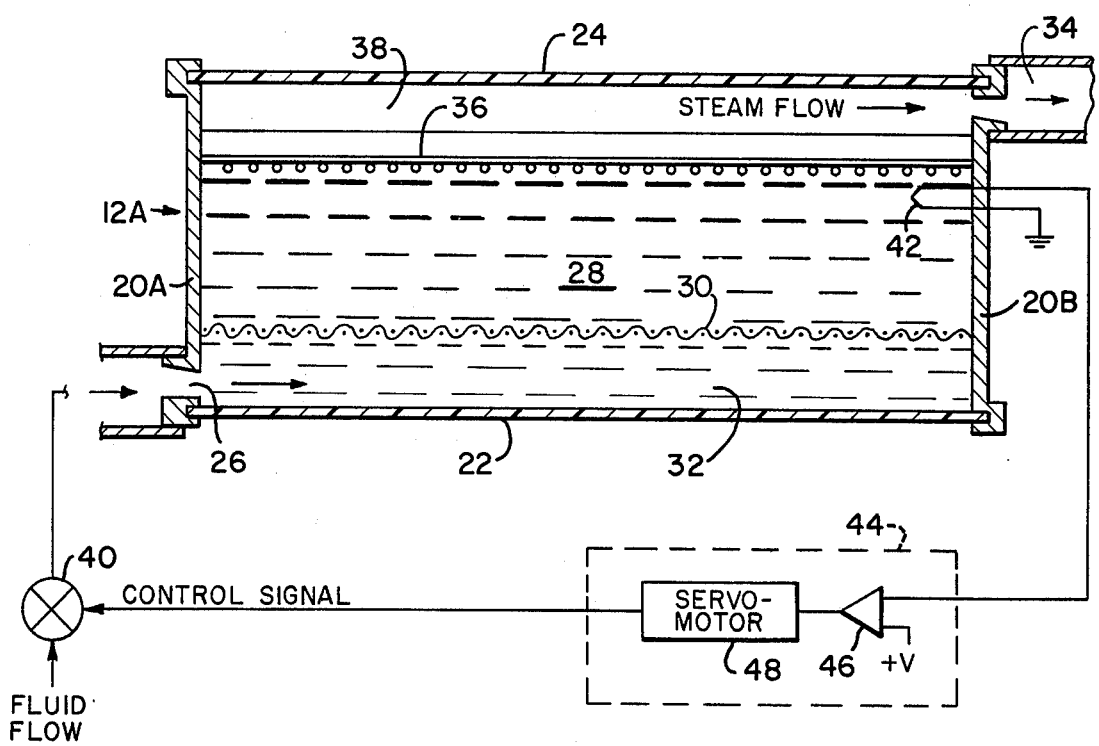
FIG. 2 shows a cross-sectional view of the tank used in the embodiment of FIG. 1.

Referring to the drawings, and in particular FIG. 1, a system incorporating the present invention generally comprises a solar collector including concentrating means, in the form of a plurality of reflectors 10, for concentrating insolation onto the fluid container 12. The latter is preferably in the form of either tank 12A (see FIG. 2) or conduit 12B (see FIGS. 3 and 4) both of which are described in greater detail hereinafter. Shown in FIG. 1 the reflectors 10 are mounted, for example, in a roof 14, having panels 16 transparent to insolation, preferably below and above the tank 12A so as to reflect a maximum amount of the radiation onto the tank 12A. Specifically, the reflectors are mounted for southern exposure (at least in the northern hemisphere). When fixedly mounted, the reflectors are oriented so that a maximum amount of radiation will be reflected to the tank 12 (indicated by lines 18) from the reflectors 10 when the sun is at its mean attitude (calculated over the period of time the system is used) with respect to the horizon. Thus, where the system is used year round, the sun will follow a path at a higher attitude during the summer than it does in the winter and the sun's path at the mean attitude can easily be determined. The reflectors are accordingly oriented to reflect maximum radiation when the sun follows that particular path. Alternatively, the reflectors could be adjustably mounted so that they can be pivoted periodically to maintain maximum radiation reflection toward the tank, or designed to track the sun always maintaining maximum reflectivity.

The tank 12A may take various forms or shapes. For example, a simple rectangular block shaped tank such as the one shown in FIG. 2 can easily be constructed. Such a tank includes sides 20 (preferably made of a heat insulative material) and preferably parallel, spaced-apart bottom and top surfaces 22 and 24, respectively. At least the bottom and preferably the top surfaces of the tank are made of a material, such as glass, capable of transmitting the solar radiation received directly from the sun as well as reflected by the reflectors 10. The tank 12A is provided with an inlet 26, preferably in the form of a flat nozzle, provided in a side 20A near the bottom surface 24 and extending the entire width of the tank (taken in the general direction perpendicular to the view shown in FIG. 2). The inlet 26 is used to introduce the heat absorbent fluid 28 (typically water) at a substantially uniform pressure across the width of the tank. For reasons which will become more apparent hereinafter, means, such as flow regulating mesh 30 is preferably although not necessarily provided, for making the flow of fluid in a direction of the bottom surface toward the top surface substantially uniform throughout the tank. Preferably, mesh 30 is disposed in a horizontal plane, substantially parallel to and spaced from the bottom surface 22 across the entire length and width of the tank, just above inlet 26 so as to form an inlet chamber 32. Mesh 30 is provided with a mesh pattern fine enough so as to offer a relatively high resistance to the flow of fluid 28 therethrough. The mesh is made of a material, such as a finely woven monofilament plastic material, transparent to the solar radiation received.

The tank 12A also comprises an outlet 34 provided across the entire width of the tank in the side 20B opposite the side 20A just below the top surface 24.

Additionally, the tank 12A comprises means for absorbing heat received directly from the sun as well as from the reflectors 10. Preferably, the means is in the form of a heat absorbing grid 36 extending across the entire width and length of the tank just below the outlet 34. This heat absorbing grid 36 preferably extends in a horizontal plane substantially parallel to the flow regulating mesh 30 and is spaced from the top surface 24 so as to form an outlet chamber 38 between the top surface 24 and the grid 36. The grid 36 is made of a substantially stiff material so as to resist movement from the flow of the fluid 28. The grid is made of either a material which is sun energy absorbent or a material coated with a sun energy absorbent material. For example, a suitable grid structure can easily be provided by two superimposed screens, each of the latter being formed, for example, by a plurality of parallel spaced-apart elongated strips slanted at an angle to the plane of the screen, or alternatively, by a plurality of parallel slits formed in a sheet of metal and deformed to provide such strips. The two screens are preferably superimposed so that the strips of one screen are perpendicular to the strips of the other screen. The particular configuration of the heat absorbing grid 36 is not critical so long as the open area provided by the interstices are relatively small compared to the heat absorbing area provided by the grid itself, so that most of the heat directed towards the grid will be absorbed.

In accordance with the present invention the heat absorbent grid 36 is spaced from the flow regulating mesh 30 so that by properly regulating the inlet flow rate of the fluid 28 into the tank, the fluid flow rate from the flow regulating mesh 30 toward the heat absorbing grid 36 is maintained so that the flow rate of heat from the heat absorbing grid to the flow regulating mesh is substantially equal to the counter directed fluid flow rate so as to establish a stationary temperature gradient between the two. In this connection, the drawings are not shown to scale. Specifically, the length and width dimensions of the tank are substantially larger than the spacing between the lower mesh 30 and upper grid 36. A typical tank would have a length in the order of 2 or 3 meters in length and 0.5 meters in width while the grid-mesh spacing would be on the order of from 30-60 mm. Where the tank is made so that the transverse fluid flow hugs the bottom 22, the mesh 30 may be omitted.

Any suitable means may be provided for adjusting the flow rate of fluid into the tank so that the flow rate of the fluid from the flow regulating mesh 30 toward the heat absorbing grid 36 maintains the heat flow from the grid 36 to the mesh 30 at a substantially equal rate. For example, an adjustable inlet valve 40, movable through various positions can be provided for adjusting the flow rate of fluid through the inlet 26 into the tank. In order to determine the correct flow rate, so as to maintain the desired temperature gradient in the tank, a thermostatic control of a type well known in the art, can be provided. For example, a thermocouple 42 is provided in the tank just below the heat absorbing grid 26 adjacent the outlet of the tank. As well known in the art, the output of thermocouple 42 provides an electrical signal representative of the temperature of the fluid adjacent the heat absorbing grid. This signal can be used to operate a servo system 44 which in turn controls the position of valve 40 to increase or decrease the fluid flow rate as necessary. For example, the servo system 44 can include a differential amplifier 46 having one input for receiving the output of the thermocouple 40 and a second output for receiving an adjustable reference signal, representative of the desired (set) temperature of the fluid 28 at the position of the thermocouple 42. As well known in the art, the differential amplifier 46 provides a signal, the value of which is a function of the difference between the two signals. The output of the amplifier can then be applied to the servomotor 48 (such as a stepping motor) which is suitably coupled to the inlet valve 40 so that the latter is turned in a direction and amount depending on the temperature difference between the measured and set temperatures.

The tank 12A together with the control system described can be connected to a heating system, for example, as generally indicated by numeral 50, which may be a closed system designed to merely circulate the fluid 28 or an open system with an external source of fluid. System 50 includes a return pipe to pump 52, which in turn pumps fluid from system 50 through the valve 40 through the tank 12A.

In operation, sufficient fluid 28 is provided in the tank 12A so that the top level of the fluid in the tank is above or at least level with the heat absorbing grid 36. Where the fluid is water and it is being heated to provide hot water, a water level can be provided high enough into the upper chamber 38 so as to exit through outlet 34 as hot water. On the other hand, where sufficient heat is provided so as to heat the water to steam, the water level is kept below the outlet so that only steam exits through the outlet. Once the tank 12A is provided with the desired amount of fluid 28, the desired operating temperature at the grid 36 is set by providing the appropriate reference voltage input to the differential amplifier 46. Thus, where steam is being generated the desired operating temperature of the fluid at grid 36 would be 100° C. and the reference voltage set accordingly. The fluid entering through inlet 26 into the inlet chamber 32 will, at least over short periods of time, be at a substantially constant temperature. Given enough heat energy from the sun the fluid 28 reaches the set temperature at the grid so that a strong vertical thermal gradient is thereby created between the grid and bottom which is accompanied by corresponding strong density gradient in the fluid due to the temperature differences. For example, with a spacing of about 45 mm between the bottom 22 and grid 36, it is believed that a thermal gradient of between 70° and 80° C. will provide a stabilizing force of about 10 newtons per square meter holding the cold water to the bottom 22. Even at relatively fast fluid flow rates, so long as the vertical temperature gradient remains substantially constant, the fluid flowing into the tank will be and will remain laminar in nature, so that the inlet fluid creeps across the entire bottom 22 and only starts to rise as it is warmed and displaced by new inlet fluid metering under it. For a 0.5m × 3m tank having a 45 mm spacing between the bottom 22 and the heat absorbing surface and a thermal gradient of about 80° C., it is believed that in accordance with a typical operation it would take about five minutes for cold incoming water to reach the far side 20B of the tank and about four hours for it to reach the grid and evaporate into steam.

On a bright sunny day, sufficient reflectors 10 are provided so that for a spacing of about 30 mm between the bottom 22 and grid 36, a concentration of about 12 kw/m² is provided, (for a spacing of 45 mm about 8 kw/m² should be provided and for a spacing of about 60 mm the concentration of about 6 kw/m² should be provided) in order to provide about an 80° C. thermal gradient so as to generate steam. With these conditions met steam will be generated in the outlet chamber 38.

The manner in which the present invention operates is believed to be easily explained based upon the following facts. First, it is known that the specific thermal conductivity of water is about 0.6 watt per (m² × C°/m); that water is essentially transparent to sun radiation and essentially opaque to its own heat radiation; and that for most temperatures water expands when heated, i.e. at a rate of about 400 ppM/C° between about 30° C. and 50° C.

Thus, water introduced to the tank will be more dense and will remain at the bottom until warmed and replaced by fresh cooler water. The sun's radiation passes freely through the water until it strikes the absorbing grid. The heat thereby liberated is conducted into the water. Much of the liberated heat then forms adjacent water to steam, some of the heat is directed toward the bottom. Where there is no flow of water, the temperature of the water below the grid would continue to rise until there was substantial heat loss through the bottom plate 22. By gently introducing water from below through the wide flat nozzle 26, the downward flowing heat is slowly absorbed by the water flowing in the upward direction so as to establish a thermal gradient between the grid 36 and the plate 22 (or flow regulating mesh 30, when the latter is used).

The above can be illustrated on example in which the desired operating temperature of the grid is 100° C. and 25° C. at the bottom. The heat flow downward is then at the rate of $0.6(W/(m^2)C°/m) \times (100°-25° C.)/0.045m = 1000 \text{ W}/m^2$. Of the 8000 W/m² of insolation provided on a sunny day, this leaves about 7000 W/m² to turn the water into steam. It requires about 626 watt hours of energy to convert a kilogram of water at its boiling point into steam. Thus, approximately 11 kilograms of water will be boiled off each square meter each hour and the mass of water in the tank will be flowing upward at the rate of about 11 millimeters per hour. To heat eleven kilograms of water from 25° C. to 100° C. in one hour requires 1.162 Wh/kgC°) × 11 kg × (100°-25°) C° ≈ 975 watt hours per hour.

Thus, substantially all of the heat being conducted downward in the tank will be used to heat the incoming water. In effect, what we have is a stationary temperature gradient with heat moving downward and water moving upward at a balanced rate which just maintains that gradient.

Figure 3:
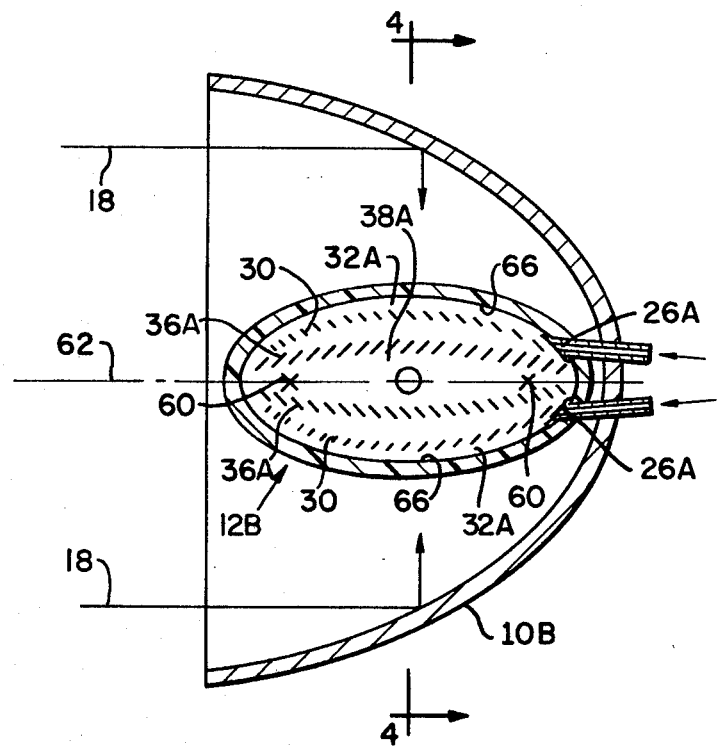
FIG. 3 is a second embodiment shown in cross-section of the present invention.
Figure 4:
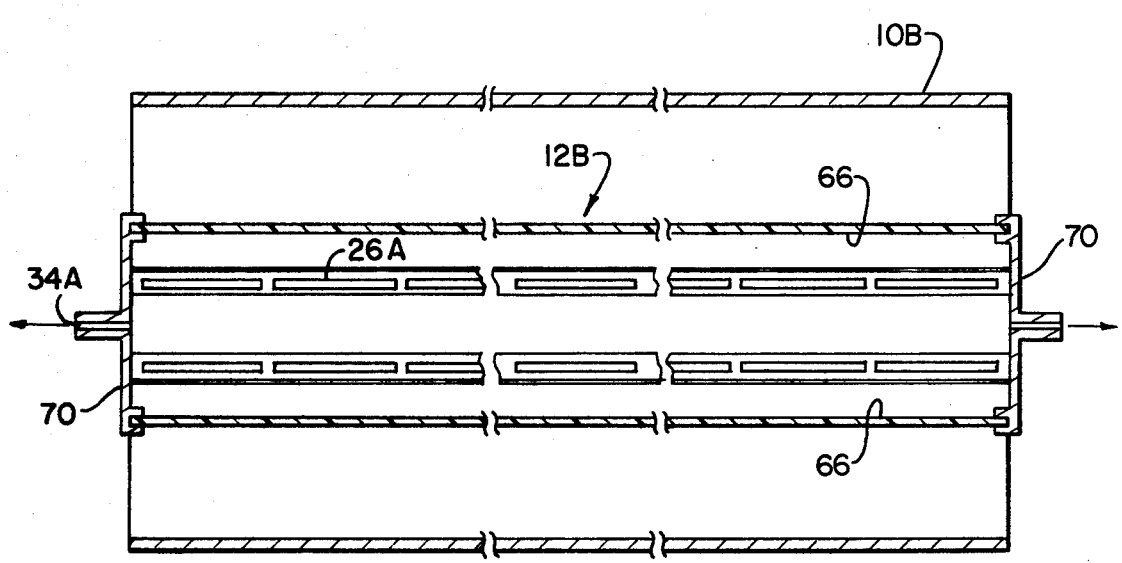
FIG. 4 is a longitudinal sectional view taken along line 4—4 of FIG. 3.

Referring to FIGS. 3 and 4, an alternative arrangement of the present invention is shown. Specifically, the reflectors 10A are replaced by reflectors 10B and the tank 12A is replaced by an elongated conduit 12B. The reflector 10B is preferably designed to provide maximum concentration on the conduit 12B. The conduit 12B is preferably of an eliptical cross section although other shapes such as a circular cross section can be utilized. Preferably, the center, or in the case of the eliptical cross section, the focal points 60 of the conduit 12B are aligned with the bisector 62 of the reflector 10B, which in turn is disposed parallel to the lines 18 of the sun's radiation when the sun is at its mean attitude.

The conduit 12B is sealed at each end with end caps 70, each of the latter being provided with outlet apertures 34A for exhausting fluid. The conduit 12B is designed so as to be substantially symmetrical about the bisector 62. Specifically, two flat inlet nozzles 26A are provided near the apex 64 of the reflector 10B on each side of bisector 62 for injecting fluid substantially tangential to the opposite inner surfaces 66 of the conduit. A flow regulating mesh 30, substantially transparent to sunlight, is spaced from each of the inner surfaces 66 and attached at the near and far edges of the conduit where the inner surfaces intersect the bisector 62 so as to form two inlet chambers 32A on each side of the bisector. Two heat absorbent grids 36A are also provided on each side of the bisector attached to the near and far edges of the conduit where the inner surfaces 66 intersect the bisector 62 so as to be spaced from a corresponding flow regulating mesh 30A and to form the outlet chamber 38A therebetween.

In operation, the fluid enters through both inlet nozzles 26A substantially tangential to the inner surfaces 66 into the inlet chambers. In this embodiment, the flow of fluid will tend to be laminar in nature as it is in tank 12A of FIG. 2 because the flow regulating mesh will provide a substantially constant flow throughout the conduit from the inlet chamber toward the outward chamber 38A. Since the reflector 10B is designed to concentrate a maximum amount of radiation onto the heat absorbent grids 30, a thermal gradient can be established from the fluid flowing out of the outlets 34 to the fluid flowing in the inlet nozzles 26A. By regulating the flow of fluid into the conduit as previously described, a constant thermal gradient can be maintained, so long as the temperature of the incoming fluid remains substantially constant.

It will be apparent therefore that by concentrating solar energy onto a heat absorbent grid in the manner described, an efficient heating system can be provided for heating a heat absorbing fluid.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. A heating system comprising:
   a container having an internal surface absorptive of solar heat radiation and a transmissive surface transmissive to said solar radiation and disposed so as to transmit solar heat radiation to said internal surface;
   means for introducing heat absorbing fluid into said container at a controllable flow rate from one side of said internal surface toward said internal surface; and
   means for withdrawing said fluid from said tank from the opposite side of said internal surface;; means adjusting the fluid flow rate into said container so that the flow rate of said fluid toward said internal surface is regulated such that the heat flow from said internal surface in the direction substantially opposite said flow of fluid provide a predetermined temperature gradient.

2. A system according to claim 1 wherein said internal surface is formed by a heat absorbing grid.

3. A system according to claim 2 wherein said transmissive surface is formed by a sheet of glass disposed on said one side of said heat absorbing grid.

4. A system according to claim 3 wherein means for introducing said heat absorbing fluid is introduced adajcent said transmissive surface, so that said flow of fluid is laminar in nature.

5. A system according to claim 4 wherein said container is a tank, and the spacing between said internal surface and transmissive surface is between about 30 and 60 mm.

6. A system according to claim 2 further comprising means for regulating the flow rate of said fluid toward said grid.

7. A system according to claim 2 further comprising reflecting means for reflecting said solar radiation toward said transmissive surface.

8. A system according to claim 2 further comprising a second transmissive surface substantially transmissive to said solar heat, said first mentioned and second transmissive surfaces being disposed on opposite sides of said grid.

9. A system according to claim 2 wherein said container is a conduit a portion of which includes said transmissive surface said transmissive surface being curved, said means for introducing heat absorbing fluid introducing said fluid substantially tangentially to said transmissive surface.

10. A system according to claim 2 further including flow regulating means disposed between said grid, and said means for introducing said heat absorbing fluid, for regulating the flow of said fluid toward said grid.

11. A system according to claim 10 wherein said flow regulating means comprises a mesh substantially transmissive to said solar radiation.

12. A method of producing heat in a system including a container having an internal surface absorptive of heat radiation, and a transmissive surface transmissive to visible radiation and disposed so as to transmit visible radiation from said transmissive surface to said internal surface, said method comprising:
   introducing a heat absorbing fluid into said tank on one side of said internal surface;
   adjusting the flow rate of said fluid into said tank so that the flow rate of said fluid toward said internal surface is regulated so that the flow rate of heat energy from the internal surface against the flow of fluid provides a predetermined thermal gradient; and
   withdrawing said heat absorbing fluid from said tank from the opposite side of said internal surface.

13. A method according to claim 12 wherein said heat absorbing fluid is introduced into said container as water and withdrawn from said container as steam.

* * * * *